United States Patent
Thoms et al.

(10) Patent No.: US 6,351,303 B1
(45) Date of Patent: Feb. 26, 2002

(54) MULTIPLE LATERAL IMAGING APPARATUS AND METHOD

(76) Inventors: Roland Thoms, Im Finkler 18, 79112 Freiburg; Martin Klein, Rosenweg 32, 17498 Alt Pansow, both of (DE)

(*) Notice: Subject to any disclaimer, the term of this patent is extended or adjusted under 35 U.S.C. 154(b) by 0 days.

(21) Appl. No.: 09/489,172

(22) Filed: Jan. 21, 2000

(51) Int. Cl.[7] .................. G03B 27/44; G03B 27/42; G03B 27/32; G01N 21/86
(52) U.S. Cl. ...................... 355/54; 355/53; 355/77; 250/548
(58) Field of Search .................. 355/53, 54, 77, 355/72, 75; 250/548; 356/399–401

(56) References Cited

U.S. PATENT DOCUMENTS

| | | | |
|---|---|---|---|
| 5,170,058 A | * 12/1992 | Berasi et al. | ............... 250/548 |
| 5,814,826 A | * 9/1998 | Thoms et al. | ............... 250/548 |
| 5,959,719 A | * 9/1999 | Williams | ..................... 355/32 |

* cited by examiner

*Primary Examiner*—Russel Adams
*Assistant Examiner*—Henry Hung Nguyen
(74) *Attorney, Agent, or Firm*—Jacobson & Johnson

(57) ABSTRACT

A method and apparatus for forming an image that is larger than the photoprinting plate by on-the-go formation of web alignment holes in a resist covered web and using the on-the-go web alignment holes to position the photoprinting plates so that a sequence of images can be formed from a single photoprinting plate with the sequence of images laterally positioned so that the images are in lateral registration so that the sequential formed images can appear as a single continuous image.

17 Claims, 9 Drawing Sheets

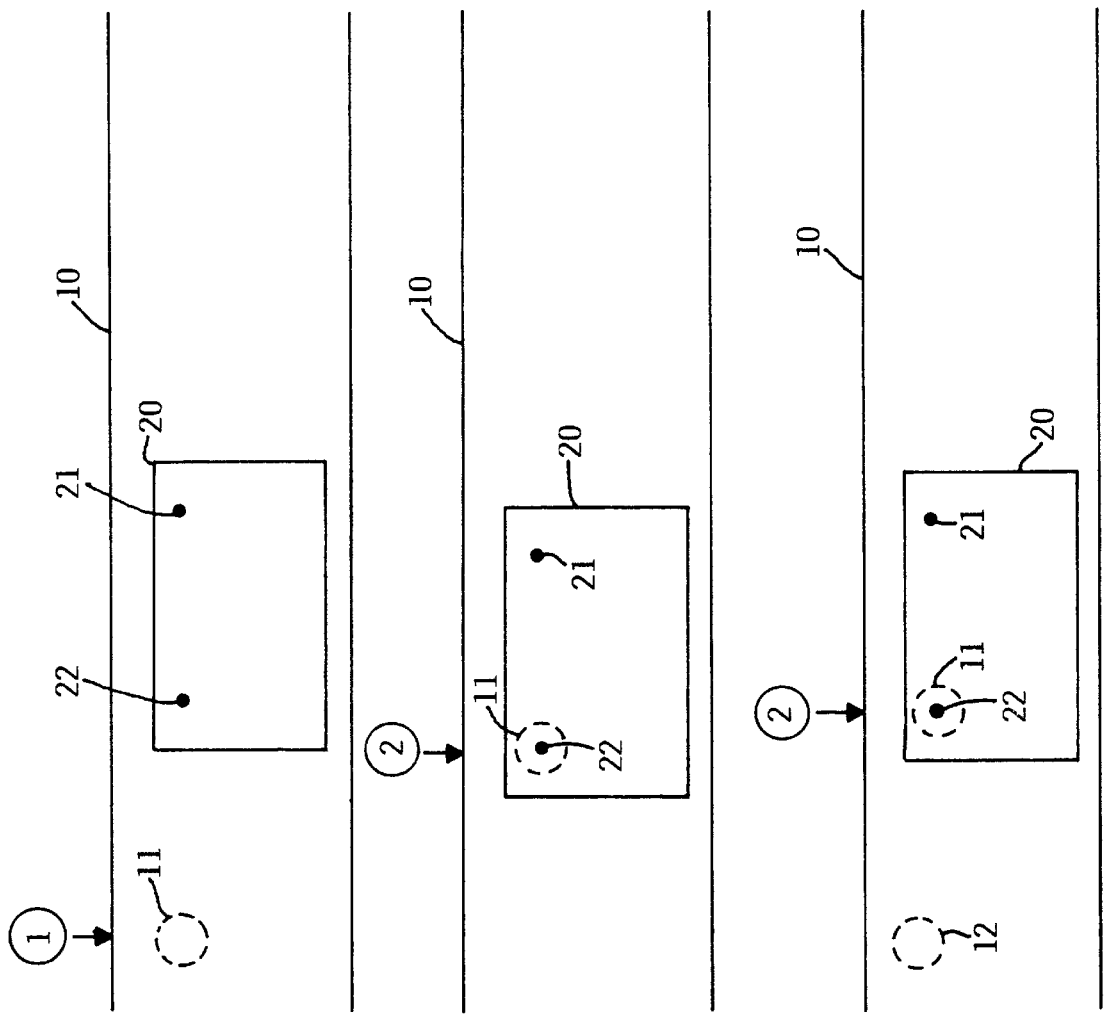

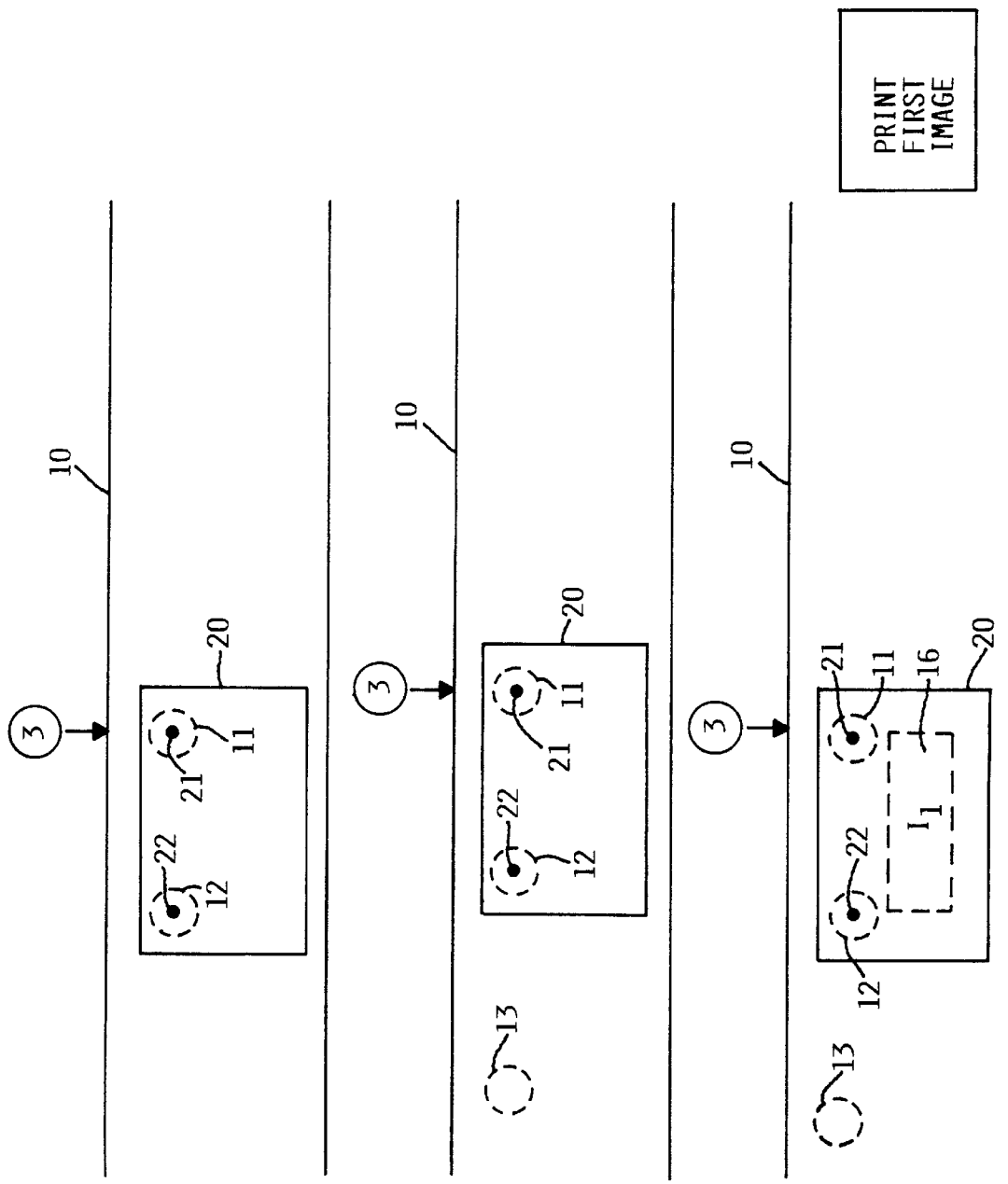

MULTIPLE LATERAL IMAGING APPARATUS AND METHOD

FIELD OF THE INVENTION

This invention relates generally to photoprinting and, more specifically, to apparatus and method for sequential positioning of photoprinting plates with respect to a resist covered web so that a single photoprinting plate can be used to form multiple images on the resist covered web with the multiple images forming a single continuous image.

BACKGROUND OF THE INVENTION

The concept of precisely alignment photoprinting plates with each other when the photoprinting plates are located on opposite sides of a resist covered web is shown and described in U.S. Pat. No. 5,814,826. Typically, one of the photoprinting plates is fixed and the other is positionable with respect to the fixed photoprinting plate by a set of drive motors. The drive motors are controlled by a compartor that determines the necessary positioning required to place the two photoprinting plates into alignment with each other. In the U.S. Pat. No. 5,814,826 a laser emitting diode is used to assist in alignment of the two photoprinting plates with each other. This method of alignment works well for accurately positioning photoprinting plates, which are located on opposite sides of a resist covered web, in alignment with each other so that when the images on the photoprinting plates are projected onto the resist covered web the images on opposite sides of the web are in precise registration with each other. Typically, aperture or shadow masks for use in cathode ray tubes and the like require registration of the images on opposite side of the web to be on the order of 0.0001 inch or less. While the alignment of photoprinting plates on opposite sides of the metal web with one another can be obtained it is more difficult to form image in lateral registration with one another. By lateral registration of images it is understood to mean two sequentially formed images in a resist covered web are located in precise registration with one another so that the two lateral images, which are produced at different times, appear as a single continuous image. By forming sequential lateral images in lateral registration one can form images on the metal web that are larger than the images that can be carried on a single photoprinting plate.

One of the difficulties with using a photoprinting plate to form multiple lateral images is the difficulty in accurately repositioning the photoprinting plates with respect to the first image so that one can project a second image onto the resist covered web which is in lateral registration with the first image. Oftentimes, sequentially formed images usually contain gaps or discontinuous images since the photoprinting plates can not be accurately positioned with respect to the first image. As a result, the images formed in the resist covered web have been generally limited by the size of the photoprinting plate. That is, if the photoprinting plate has a width of 30" the image projected from the photoprinting plate onto the resist covered web needs to be less than 30" in order to obtain the necessary precision in the projected image. One of the problem with large photoprinting plates, which are typically made from glass, is that they are both expensive to make and subject to breakage. Thus a need exists for maintaining smaller photoprinting plates while having the ability to form large images.

Consequently, because of the difficulty in accurately positioning of the photoprinting plates so that a second image can be combined with a first image to produce a larger composite image the size of the images have been generally limited by the size of the photoprinting plate. With the present invention, the size of the usable image formed on the resist covered metal web can be larger than the photoprinting plate. That is, by use of an alignment method and apparatus one can not only precisely align two photoprinting plates with respect to one another but one can use the photoprinting plates to form a first printed image and then by being able to precisely reposition the photoprinting plates with respect to the web one can print a second image which is in register with the first image. To provide for sequential formation of images in register one uses an on-the-go formation of a set of web alignment holes in the resist covered web. The web alignment holes, which are formed in the web by a punch or the like are used to accurately position the web proximate the reference markings on the photoprinting plate so that one can print sequential images in precise registration with each other.

BRIEF DESCRIPTION OF THE DRAWINGS

FIG. 1 is partial front view of a resist coated web having a first alignment hole therein with the resist covered web located in a first position proximate a first photoprinting plate having a first and a second reference mark thereon;

FIG. 2 shows the resist coated web and photoprinting plate of FIG. 1 with the resist covered web advanced to a second position wherein the first alignment hole is in alignment with the first reference mark on the photoprinting plate;

FIG. 3 shows the resist coated web and photoprinting plate in the same position as shown in FIG. 2 with the resist covered having a second alignment hole formed therein;

FIG. 4 shows the resist coated web as shown in FIG. 3 having been advanced to a third position where the second alignment hole is in alignment with the first reference mark on the photoprinting plate and the first alignment hole is in alignment with the second reference mark on the photoprinting plate;

FIG. 5 shows the resist coated web and photoprinting plate shown in the position of FIG. 4 with a third alignment hole having been formed in the resist covered web;

FIG. 6 shows the resist coated web and photoprinting plate in the position shown in FIG. 5 with a first image having been formed on the resist covered web;

SUMMARY OF THE INVENTION

Figure 7:
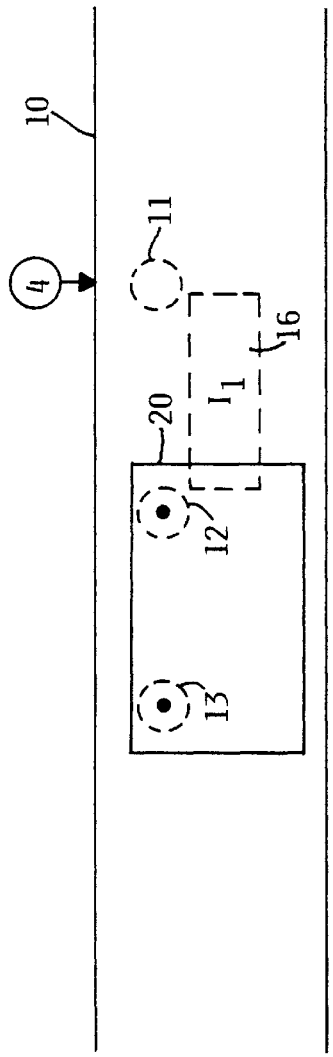
FIG. 7 shows the resist coated web and photoprinting plate of FIG. 6 with the resist covered web moved to a fourth position wherein the second hole is in alignment with the second reference mark and the third hole is in alignment with the first reference mark.

Briefly, the present invention comprises a method and apparatus for forming a composite image on a resist covered web with the composite image larger than the photoprinting plate by using a photoprinting plate to form a first image on a resist covered web, forming a web alignment hole in the resist covered web when the photoprinting plate is in position to form the first image in the resist covered web and then using the web alignment hole and reference marks on the photoprinting plate to reposition the photoprinting plate with respect to the resist covered web so that a second image can be formed in the resist covered web using the same photoprinting plate with the first and second images formed in the resist covered web located in registration with one another so that the first and second image appear as a single continuous image.

DESCRIPTION OF THE PREFERRED EMBODIMENT

FIG. 1 is partial schematic view front view of a resist coated web 10 having a first alignment hole 11 (indicated by dashed lines) therein with a moveable resist covered web 10 located in a first position (indicated by an arrow with the numeral 1 positioned thereabove). The resist covered web is shown in a vertical orientation proximate a vertically oriented photoprinting plate 20. Photoprinting plate 20 is shown having a first reference mark 22 and a second reference mark 21 spaced therefrom. By resist covered web it is understood to mean that the web 10 contains a light sensitive material thereon so that when a suitable light source is directed at the photoprinting plate 20 it projects an image onto the resist covered web 10 which can be developed to leave a pattern of etchant resistant material thereon. With selective retention of the etchant resist the exposed metal can be etched to form a desired pattern. Typically, this type of formation of resist patterns is well known in the art and is used in the formation of shadow mask and the like wherein small and precisely positioned openings are formed in metal webs.

In order to understand the operation of the invention of printing sequential images which are in sufficient register to appear as a single image reference should be made to FIGS. 1–12. FIG. 1 shows a photoprinting plate 20 located on one side of a resist covered metal web 20. In most cases a second photoprinting plate is located on the opposite side of the resist covered web for forming a complimentary image on the opposite side of the metal web. To illustrate operation of the present invention only one photoprinting plate is shown in FIGS. 1–12; however, in most cases two photoprinting plates will be used. As the light exposure of the resist covered web through application of a suitable light source on a photoprinting plate is known in the art it will not be described herein.

FIG. 1 shows that in the resist covered web 10 a circular hole 11 (indicated by a dashed circle) has been formed in the web, typically the hole is formed by punching or the like and is formed in an edge portion of the web that is normally discarded or does not contain the resist. With the web 10 shown in the position in FIG. 1 one can take the first step in using the same photoprinting plate to sequentially form a set of images into a single continuous image.

FIG. 2 shows the resist coated web and photoprinting plate of FIG. 1 with the resist covered web 10 advanced to a second position, which is indicated by an arrow with the numeral 2 positioned thereabove. In this position, the first alignment hole 11 is in alignment with the first reference mark 22 on the photoprinting plate. Alignment of the photoprinting plate 20 can be achieved with positioning motors and a compartor that determine the location of the reference mark 22 with respect to the alignment hole 11. In FIG. 2 the reference marks 21 and 22 are shown as solid circles which are located on and are visible on the transparent glass photoprinting plate. The alignment hole is shown as a larger circular opening in the metal web so that the web 10 can be generally positioned so the reference mark is visible through the alignment hole 11.

FIG. 3 shows the resist coated web 10 and photoprinting plate 20 in the same position as shown in FIG. 2 with a second alignment hole 12 having been formed in the resist covered web 10. It should be pointed out that the second alignment hole is not preformed but is being formed while the resist covered web is positioned between a pair of photoprinting plates by use of punch or the like. That is, the alignment holes are formed on-the-go. After formation of the second alignment hole the web 10 is advanced to the condition shown in FIG. 4.

FIG. 4 shows the resist coated web shown in FIG. 3 advanced to a third position, which is indicated by an arrow with the numeral 3 positioned thereabove. In this position the second alignment hole 12 is in alignment with the first reference mark 22 on the photoprinting plate 20 and the first alignment hole 21 is in alignment with the second reference mark 11 on the photoprinting plate 20. Thus the first two alignment holes are formed so that they will be in general alignment with the two reference marks 21 and 22.

FIG. 5 shows the resist coated web and photoprinting plate 20 shown in the position of FIG. 4 with a third alignment hole 13 having been formed in the resist covered web while one maintains the first two alignment holes 11 and 12 in alignment with reference marks 22 and 21. That is alignment holes 11 and 12 and reference marks 22 and 21 are used to determine the location of the third alignment hole 13 which results in the alignment holes being located in precise position with respect to one another. Before the metal web 10 is moved to the next position the photoprinting plate 20 is used to form a first image 16 on the resist covered web 10.

FIG. 6 shows the resist coated web and photoprinting plate 20 in the position shown in FIG. 5 with the first image 16 having been formed on the resist covered web 10. Note, the image 16 has been formed with reference marks 22 and 21 in alignment with alignment holes 11 and 12. After printing of the first image 16 the photoprinting plate 20 is retracted from the web to allow movement of the web to the position shown in FIG. 7.

FIG. 7 shows the resist coated web 10 and photoprinting plate of FIG. 6 with the resist covered web moved to a fourth position (indicated by an arrow with the numeral 4 positioned thereabove) wherein the second hole 12 is now in alignment with the second reference mark 21 and the third hole 13 is now in alignment with the first reference mark 22. As the formation of the alignment hole 13 occurred when alignment holes 11 and 12 were in alignment with the reference marks it is evident that when the alignment hole 13 is in alignment with the reference mark 22 the metal web 10 with the first formed image 16 will have been moved a precise distance.

Figure 8:
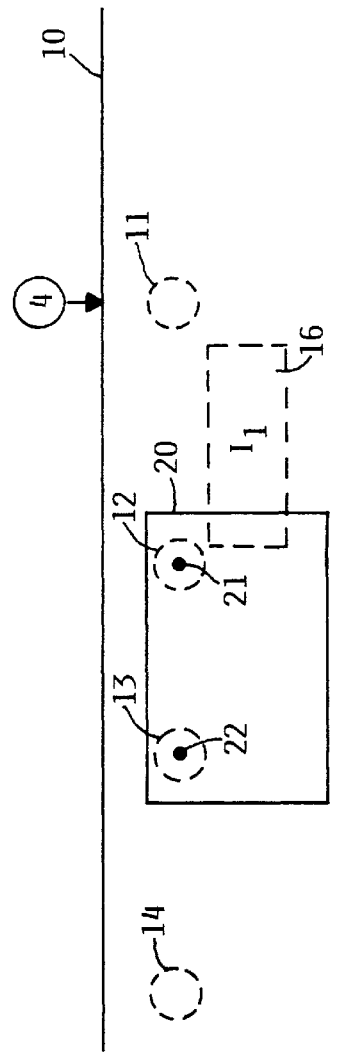
FIG. 8 shows the resist coated web and photoprinting plate in the fourth position shown in FIG. 7 with a fourth alignment hole having been formed in the resist covered web.

FIG. 8 shows the resist coated web 10 and photoprinting plate 20 in the fourth position shown in FIG. 7 with a fourth alignment hole 14 having been formed in the resist covered web 10. The fourth alignment hole will be used for further movement of the web 10; however, before doing so a second image will be formed on the resist covered web.

Figure 9:
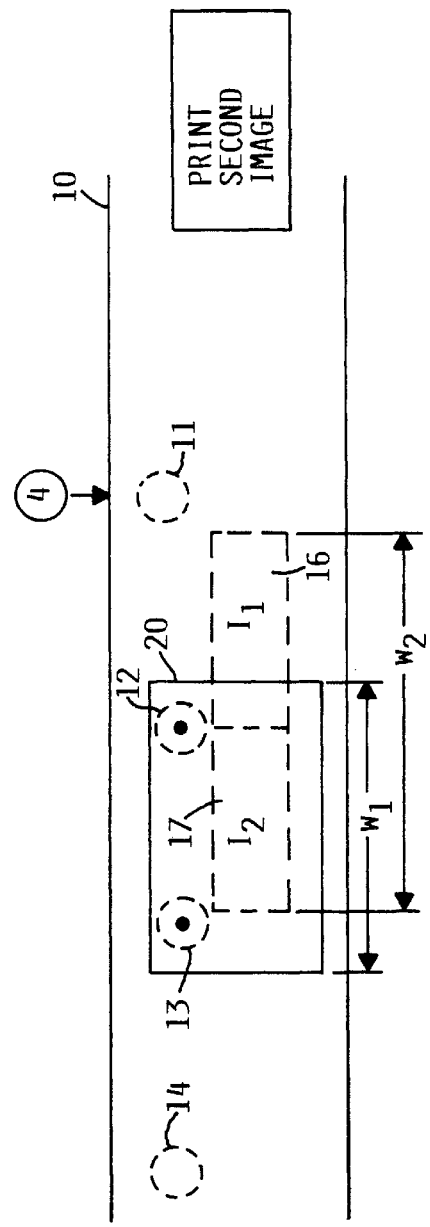
FIG. 9 shows the resist coated web and photoprinting plate in the position shown in FIG. 6 with a second image formed in the resist covered web.

FIG. 9 shows the resist coated web and photoprinting plate in the fourth position shown in FIG. 6 with a second image 17 formed in the resist covered web 10. By use of alignment holes 12 and 13 the second image 17 can be formed in precise lateral registration with the first image 16 with the composite image having a width $w_2$ which is larger than the width $w_1$ of photoprinting plate 20.

Figure 10:
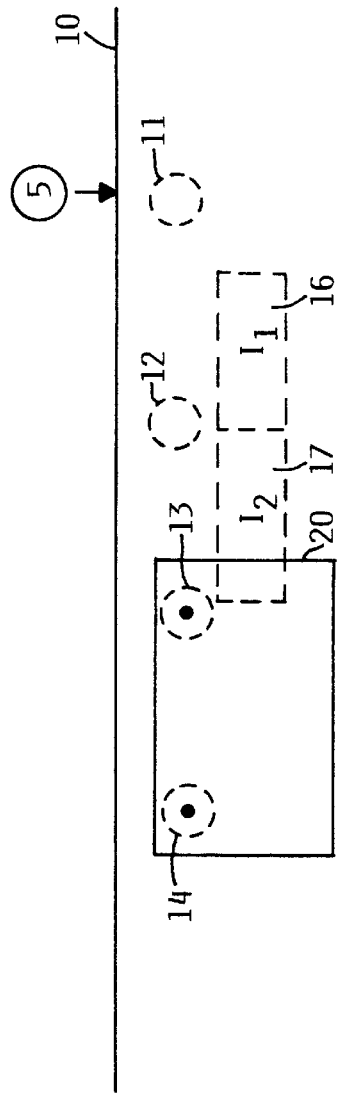
FIG. 10 shows the resist covered web and the photoprinting plate of FIG. 9 with the resist covered web advanced to a fifth position wherein the third alignment hole is in alignment with the second reference mark and the fourth alignment hole is in alignment with the first reference mark.
Figure 11:
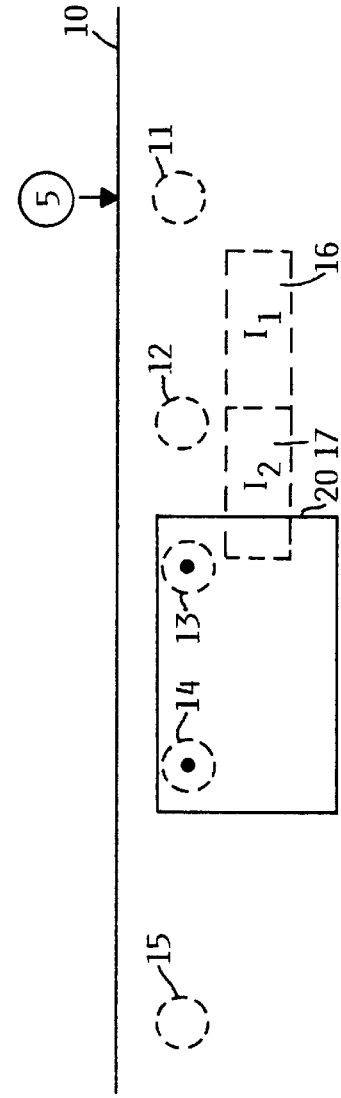
FIG. 11 shows the resist covered web and the photoprinting plate in the fifth position with a fifth hole having been formed in the resist covered web.
Figure 12:
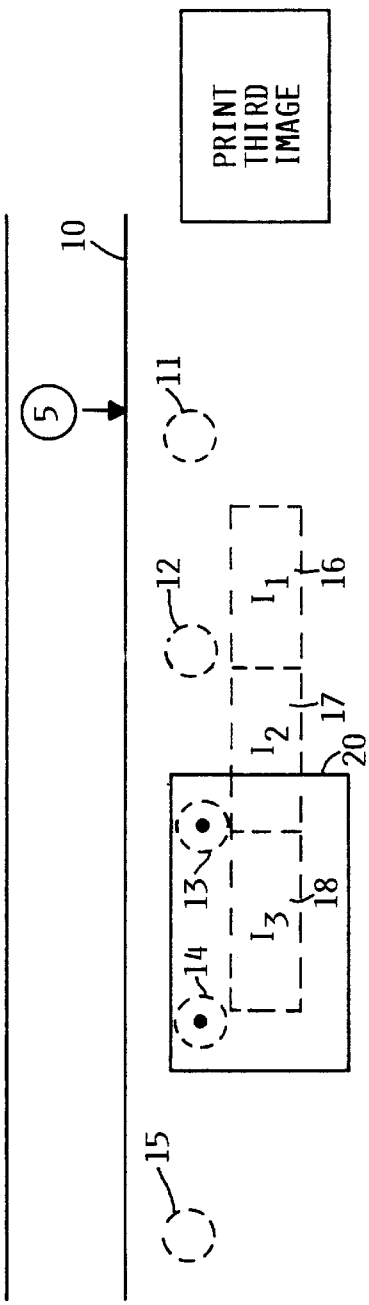
FIG. 12 shows the resist covered web and the photoprinting plate in the fifth position as shown in FIG. 11 with a third image having been printed in register with a second image on the resist covered web.

To illustrate the further continuance of the method to further extend the length of the image reference should be made to FIGS. 10 to 12. FIG. 10 shows the resist covered web and the photoprinting plate of FIG. 9 with the resist covered web 10 advanced to a fifth position (indicated by an arrow with the numeral 5 positioned thereabove) wherein the third alignment hole 13 is in alignment with reference mark 21 and the fourth alignment hole 15 is in alignment with the reference mark 14. It will thus be envisioned that the resist covered metal web 10 has again been advanced a precise amount because the alignment holes and the metal web can be accurately positioned with respect to one another.

FIG. 11 shows the resist covered web 10 and the photoprinting plate 20 in the fifth position with a fifth hole having been formed in the resist covered web 10 to enable further in register printing of images.

FIG. 12 shows the resist covered web 10 and the photoprinting plate 20 in the fifth position as shown in FIG. 11 with a third image 18 having been printed in lateral registration with a second image 17 which is in lateral registration with first image 16 on the resist covered web 10.

Figure 13:
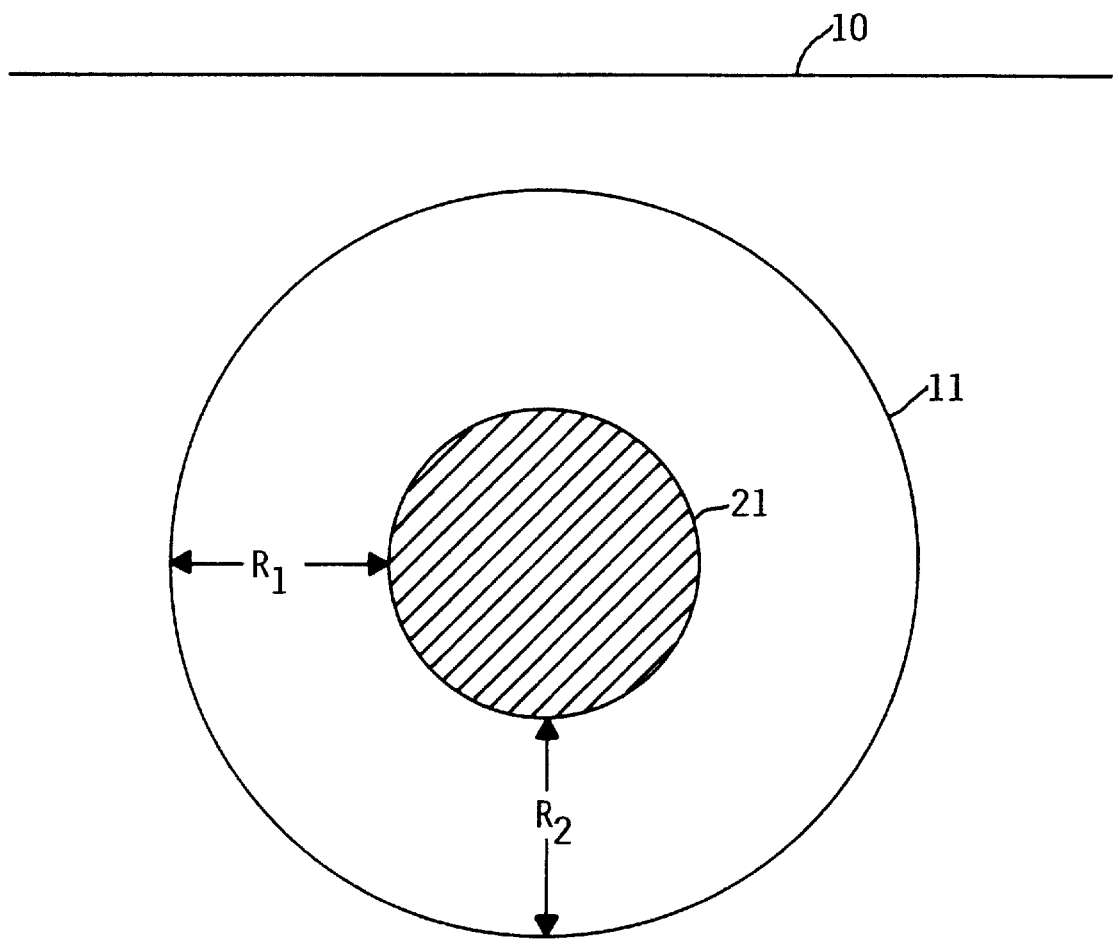
FIG. 13 shows a portion of a web having an alignment hole therein positioned in general alignment with a reference mark on a first photoprinting plate.

While the general alignment of the alignment holes with the reference mark has been shown in FIGS. 1–12, the precise locating of the reference mark with respect to the alignment hole is illustrated in FIG. 13. FIG. 13 shows a portion of a web 10 having an alignment hole 11 therein positioned in general alignment with a reference mark 21 on a first photoprinting plate 20. One notes that the reference mark 21 is postionable within the confines of alignment hole 11 by the distance $R_1$ from one side of alignment hole 11 and the distance $R_2$ from the bottom of the alignment hole 11. By use of optical compartor one can determine the coordinate position of the reference mark 21 with respect to alignment hole 11. These coordinates can then be used to reposition the photoprinting plate with reference marks 21 with respect to the alignment hole thus assuring that the metal web 10 and the photoprinting plate are in precise position for forming lateral images in registration.

Figure 14:
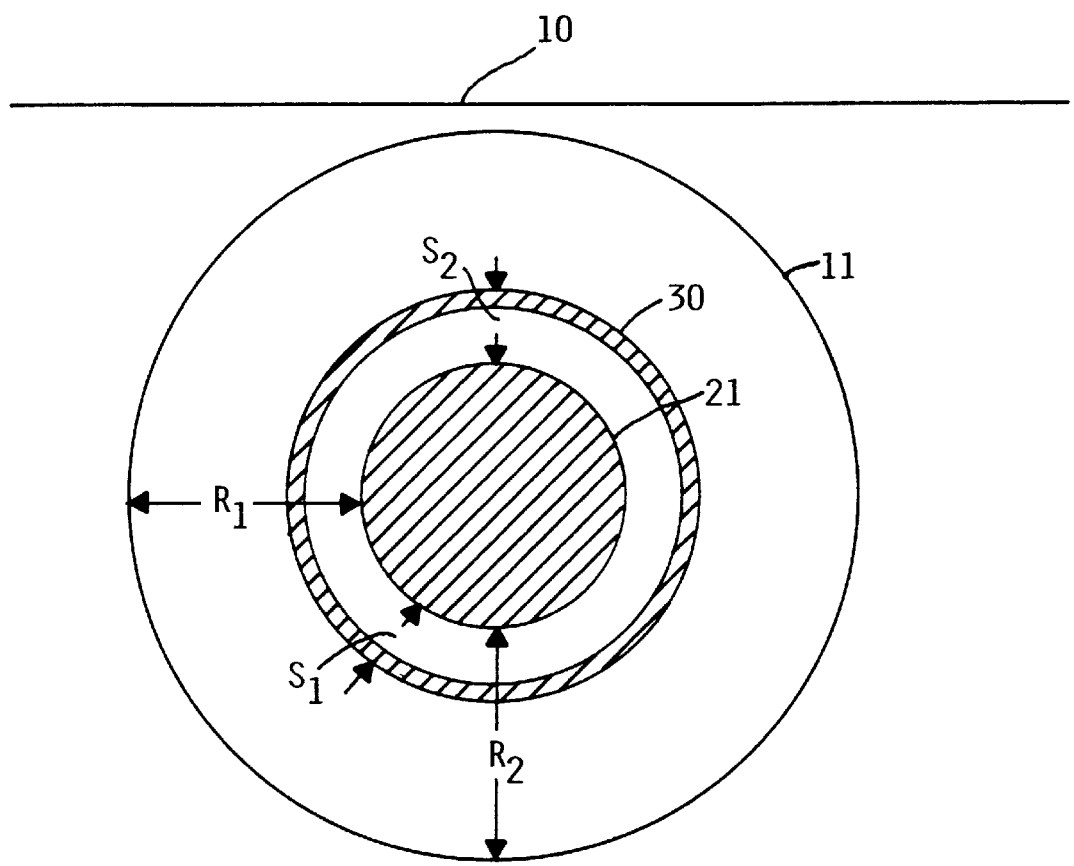
FIG. 14 shows the portion of a web shown in FIG. 13 with the alignment hole of the resist covered web in general alignment with a first reference mark on a first photoprinting plate located on one side of the web and a first reference mark on a second photoprinting plate located on the opposite side of the web wherein the first photoprinting plate and the second photoprinting plates are formed in alignment to each other to maintain registration of images from the photoprinting plates located on opposite sides of the web.
Figure 15:
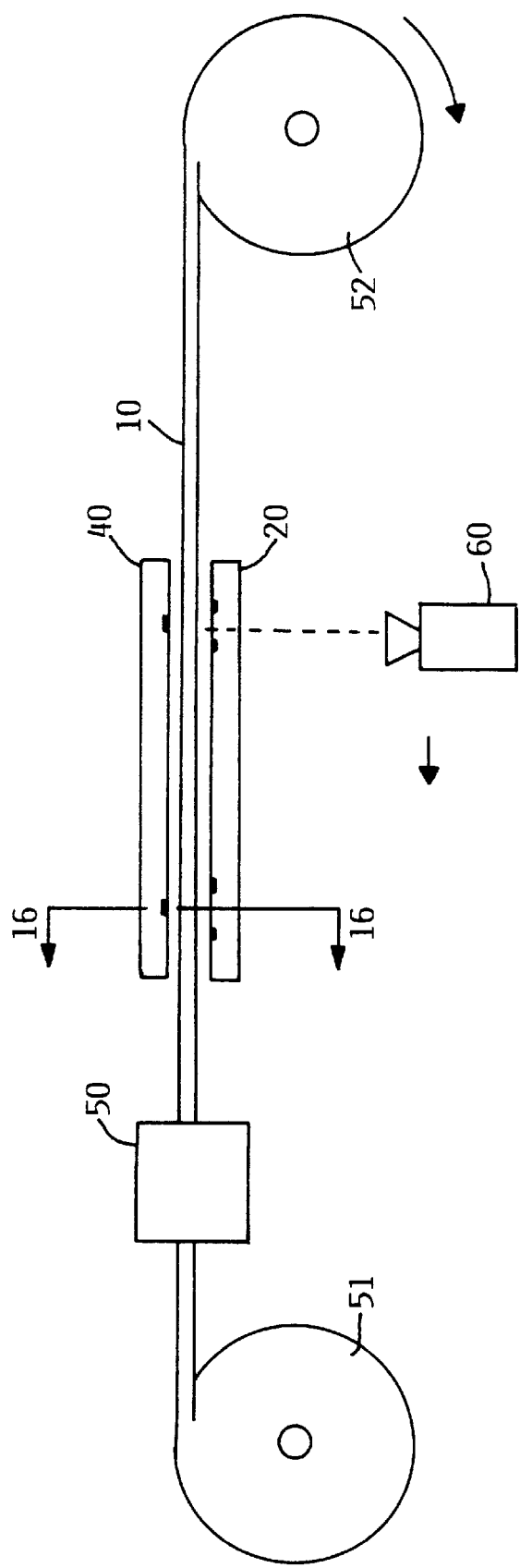
FIG. 15 shows a partial top schematic view of the photoprinting plate and movable web positioned proximate a hole forming member.

To illustrate how a second photoprinting plate which is located on the opposite side of the metal web is positioned reference should be made to FIG. 15 and FIG. 14. FIG. 15 is a top view of a first photoprinting plate 20 on one side of metal web 10 and a second photoprinting plate 40 on the opposite side of web 10. The metal web 10 is shown being unwound from a first roll 51 and passing through a hole punch mechanism 50 between the photoprinting plates 20 and 40 and into a take up roller 52. A camera 60 is shown which is positioned to view the alignment hole and the reference marks on the photoprinting plates.

Figure 16:
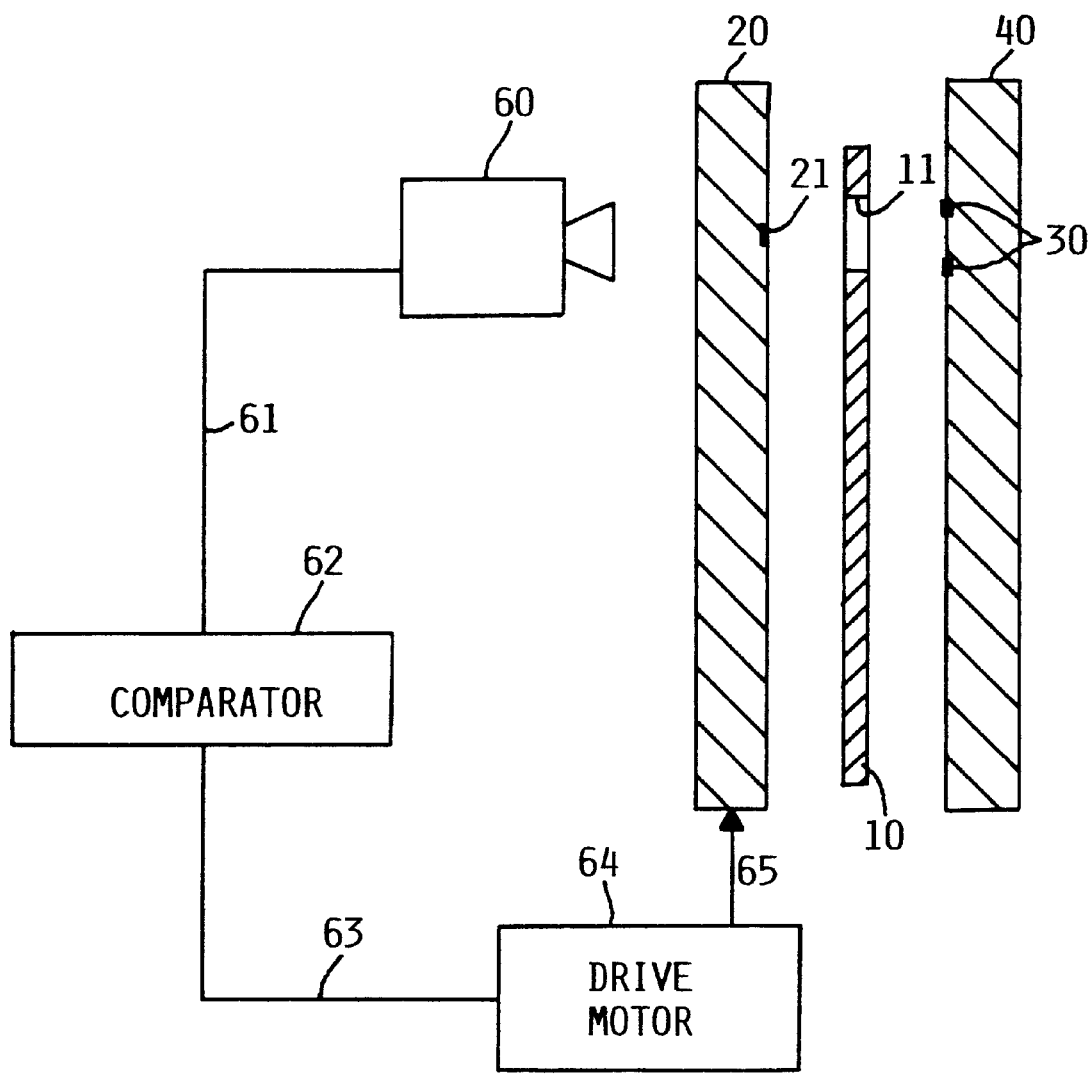
FIG. 16 is a sectional view taken along lines 16—16 showing the photoprinting plates and the metal web.

In order to appreciate the alignment of the two photoprinting plates 20 and 14 a reference to FIG. 16 reveals the photoprinting plates 20 and 40 in cross section with photoprinting plate 20 shown with a circular reference mark 21 and photoprinting plate 40 shown with an annular reference mark 30 thereon. A camera 60 is shown connector to compartor 62 by lead 61 and comparator 62 is shown connected to drive motor 64 by lead 63. An extension and retraction member 65 provides for displacement of the photoprinting plate 20. The use of a comparator and drive motor for displacement of the photoprinting plate is more fully described in the aforementioned U.S. Pat. No. 5,814,826.

A reference to FIG. 14 shows a view visible by camera 60 with a portion of a web 10 having a hole 11 therein. The reference mark 21 of photoprinting plate 20 is visible through alignment hole 11 as is the annular reference mark 30 which is located on photoprinting plate 40. It was previously described how the reference mark 21 can be aligned with respect to the alignment hole 11 to obtain alignment of photoprinting plate 20. It now can be appreciated that the annular alignment mark 30 can also be aligned with respect to the first reference mark and consequently photoprinting plate 40 by determining the coordinates or the distances $S_1$ and $S_2$ that the second reference mark is positioned with respite to the first reference mark.

Thus with the present invention the larger alignment hole forms a first position fix so that the reference marks and consequently the position of the photoprinting plates can be brought into general alignment with each other. Once the reference marks and alignment holes are in general alignment one can more precise align the photoprinting plates and the web by use of comparator and drive members that will accurately [located] locate the photoprinting plates with respect to the web by use of the reference marks and alignment holes.

Figure 17:
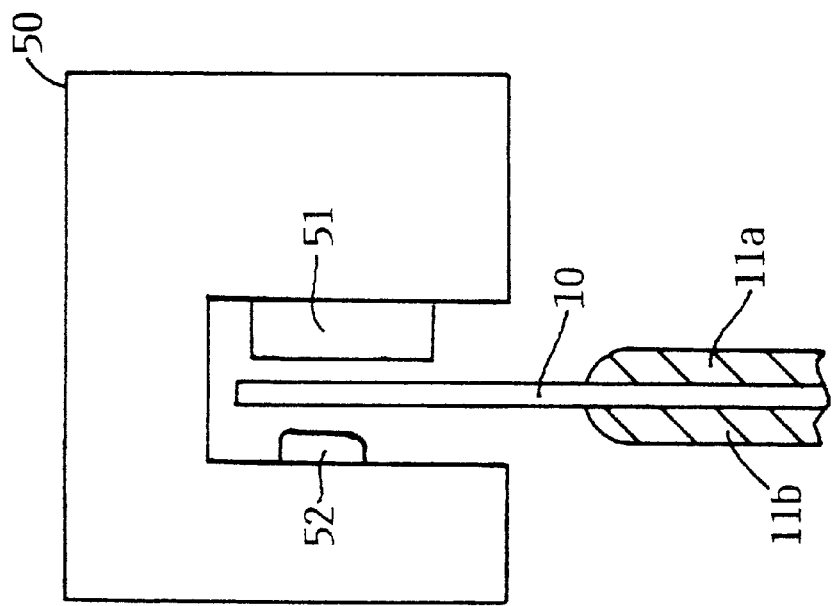
FIG. 17 shows the hole forming member in a retracted position prior to forming an alignment hole in the metal web.
Figure 17A:
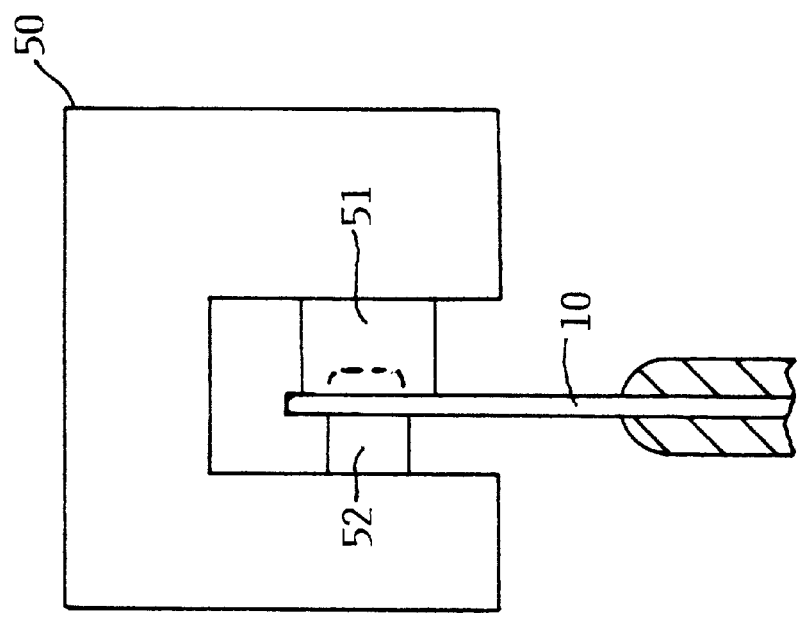
FIG. 17a shows a punch in the hole forming member in an extended condition forming an alignment hole in the web.

In order to appreciate the hole forming mechanism reference should be made to FIG. 17 and 17a, which shows a punch 50 having a first member 51 and a second member 52. A web 10 is located therebetween with the web having a first resist 11a on one side and a second resist 11b on the opposite side. In this embodiment the uncovered portion of the web 11 extends into the punch 50. While FIG. 17 shows the hole forming member in a retracted position prior to forming a hole in the metal web FIG. 17a shows a punch in the hole phase with punch 52 having being extended into punch member 51 through the metal web 11 thus forming a through hole through the metal web.

In the embodiment shown the hole punched in the web is circular;however it is envisioned that other shape holes are within the scope of this invention.

We claim:

1. A method of forming sequential images in lateral registration with one another in a resist covered web comprising the steps of:
   forming a first photoprinting plate having a first reference mark thereon;
   placing the first photoprinting plate having the first reference mark on one side of a resist covered web;
   forming a first see through hole in the resist covered web;
   positioning the web so that the first hole in the resist covered web is in alignment with the first reference mark on the photoprinting plate;
   forming a second hole in the resist covered web while the first hole is in alignment with the first reference mark;
   positioning the web so that the first hole in the resist covered web is in alignment with a second reference mark on the photoprinting plated and the second hole in the web is in alignment with the first reference mark;
   forming a first image on the resist covered web;
   forming a third hole in the resist covered web;
   positioning the resist covered web so that the second hole in the web is in alignment with the second reference mark and the third hole is in alignment with the first reference mark; and
   forming a second image on the web with the second image located in lateral registration with the first image to form a single continuous image on the web.

2. The method of claim 1 including the step of:
   placing a second photoprinting plate having a further reference mark on the opposite side of the resist covered web to enable the first photoprinting plated to be aligned with the second photoprinting plate so that the images formed on opposite sides of the resist covered web are in register with each other.

3. The method of claim 1 including the step of maintaining a hole forming member in a fixed position during hole formation in the web.

4. The method of claim 1 wherein the step of forming a hole comprises punching a hole in the web.

5. The method of claim 1 wherein the step of forming a hole comprises forming a circular hole in the web.

6. The method of claim 1 wherein the formation of the first mark comprises formation of a circular reference mark.

7. The method of claim 6 wherein the step of formation of a further mark comprises the formation of an annular reference mark on the second photoprinting plate.

8. The method of claim 7 wherein the further mark and the first reference mark are positioned in axial alignment with each other by viewing the further reference mark through the hole in said first photoprinting plate.

9. The method of claim 8 wherein the lateral spacing of the first reference mark relative to the further reference mark is viewed by a comparator.

10. An apparatus for printing sequential images in register comprising:
    a first photoprinting plate, said first photoprinting plate having a first reference mark thereon;
    a metal web having a light sensitive coating thereon;
    a web drive member for moving said web from a first position to a second position; and
    a hole forming member, said hole forming member positioned proximate said metal web for forming a see through hole in said metal web so that the see through hole formed in the metal web and the first reference mark can be brought into alignment with one another by moving the web from the first position to the second position to enable the sequential forming of a first image and a second image with the first image and the second image being in register with one another to form a composite image.

11. The apparatus of claim 10 including a second photoprinting plate, said second photoprinting plate located on one side of said metal web and the first photoprinting web is located on the opposite side of said metal web.

12. The apparatus of claim 11 wherein the second photoprinting plate includes a further reference mark thereon.

13. The apparatus of claim 12 including a comparator for viewing the further reference mark and the first reference mark in relative position to one another through the hole in the metal web.

14. The apparatus of claim 10 wherein the hole forming member comprises a punch.

15. The apparatus of claim 10 wherein the first reference mark is a solid circle and the second reference mark is an annular mark with both the diameter of the solid circle and the annular reference mark being less than the diameter of the alignment hole.

16. The apparatus of claim 15 wherein the diameter of the solid circle is less than the diameter of the annular mark so that the solid circle can be oriented within the annular reference mark.

17. A method of forming sequential images in lateral registration with one another in a resist covered web comprising the steps of:
    forming a reference mark on a photoprinting plate;
    forming an on-the-go alignment hole in a metal web with the alignment hole sufficiently large so as to view the reference mark therethrough to enable relative position of the alignment hole and the reference mark;
    moving the web until the alignment hole is in alignment with the reference mark; and
    forming an image sequentially in lateral registration on the resist covered web to allow for the formation of a composite image with the formation of further images on the resist covered web.

* * * * *